(12) United States Patent  
Auriac

(10) Patent No.: US 10,087,664 B2  
(45) Date of Patent: Oct. 2, 2018

(54) DEVICE FOR OPERATING AT LEAST ONE AIRCRAFT DOOR COMPRISING A CONTROL HANDLE

(71) Applicant: Airbus Operations (S.A.S.), Toulouse (FR)

(72) Inventor: Vincent Auriac, Saint Orens de Gameville (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 212 days.

(21) Appl. No.: 15/013,876

(22) Filed: Feb. 2, 2016

(65) Prior Publication Data

US 2016/0230433 A1 Aug. 11, 2016

(30) Foreign Application Priority Data

Feb. 6, 2015 (FR) ...................................... 15 50938

(51) Int. Cl.
*E05C 5/04* (2006.01)
*B64C 1/14* (2006.01)
(Continued)

(52) U.S. Cl.
CPC .............. *E05C 5/04* (2013.01); *B64C 1/1446* (2013.01); *B64C 25/16* (2013.01); *B64D 29/08* (2013.01); *E05C 3/122* (2013.01); *E05C 19/12* (2013.01)

(58) Field of Classification Search
CPC ....... B64C 1/1446; B64C 25/16; B64C 25/26; B64D 29/08; E05C 3/122; E05C 19/12; E05C 1/145; E05B 13/004
See application file for complete search history.

(56) References Cited

U.S. PATENT DOCUMENTS 5,072,978 A * 12/1991 Woodward .............. E05B 13/00  
    292/359  
5,368,347 A * 11/1994 Holtman ............... E05B 65/006  
    292/1  
(Continued)

FOREIGN PATENT DOCUMENTS

WO 2012/096986 7/2012

OTHER PUBLICATIONS

French Search Report cited in FR 1550938 completed Dec. 3, 2015, one page.

*Primary Examiner* — Michael H Wang  
(74) *Attorney, Agent, or Firm* — Nixon & Vanderhye P.C.

(57) ABSTRACT

An operating device for operating at least one door of an aircraft comprises a chassis that is fixed and secured to a fuselage of the aircraft, a control handle that is rotationally and translationally movable with respect to the chassis, a mechanism for converting a rotational movement of the control handle into an opening movement of the door. The translational movement allows the control handle to be in an in position in which it is aligned with the exterior surface of the fuselage and an out position in which it projects beyond the exterior surface of the fuselage. The control handle includes a cylindrical body and a head connected to one end of the body. The head of the control handle includes a fixed part rigidly connected to the body of the control handle and extending perpendicular thereto, and a movable part rotatably connected to the body and having a folded-down position against the fixed part and a deployed position in which the control handle has a T shape.

19 Claims, 6 Drawing Sheets

(51) Int. Cl.
  *B64C 25/16* (2006.01)
  *B64D 29/08* (2006.01)
  *E05C 3/12* (2006.01)
  *E05C 19/12* (2006.01)

(56) References Cited

U.S. PATENT DOCUMENTS

| | | | | |
|---|---|---|---|---|
| 5,526,660 A * | 6/1996 | Bennett | ............... | E05B 13/004 292/336.3 |
| 6,474,119 B1 * | 11/2002 | Halvorson | ............ | E05B 85/107 292/336.3 |
| 6,867,685 B1 * | 3/2005 | Stillwagon | .............. | E05B 5/003 292/341.16 |
| 7,454,933 B1 * | 11/2008 | Paige | ................... | E05B 1/0092 292/207 |
| 8,291,732 B2 * | 10/2012 | Ramsauer | ............ | E05B 1/0092 292/32 |
| 9,404,296 B2 * | 8/2016 | McMahon | ................ | E05C 3/16 |
| 2005/0116106 A1 * | 6/2005 | Perez-Sanchez | ......... | B64C 1/36 244/129.4 |
| 2010/0171326 A1 * | 7/2010 | Bacon | .................. | E05B 13/108 292/336.3 |
| 2013/0106122 A1 * | 5/2013 | Do | ......................... | B64D 29/06 292/228 |
| 2013/0200212 A1 * | 8/2013 | Lecourtier | ............. | B64C 19/00 244/99.3 |
| 2017/0009500 A1 * | 1/2017 | Do | ........................... | E05C 5/02 |

* cited by examiner

DEVICE FOR OPERATING AT LEAST ONE AIRCRAFT DOOR COMPRISING A CONTROL HANDLE

RELATED APPLICATION

This application claims priority to Application No. FR1550938 filed on Feb. 6, 2015, incorporated herein by reference as if expressly set forth.

TECHNICAL FIELD

The technology herein relates to a device for operating at least one aircraft door comprising a control handle translationally movable between an "in" position and an "out" position with respect to a fuselage of the aircraft.

BACKGROUND

An operating device that allows the doors of a landing gear bay to be opened and that comprises a lever secured to a ratchet wheel, the rotation of which causes the front doors to rotate is generally known in the prior art. This lever is positioned inside the landing gear bay so that it does not affect the drag of the airplane and is accessible through the opening of the rear doors.

Such a device has the disadvantage of being difficult for an operator on the ground to access.

SUMMARY OF THE INVENTION

The technology herein seeks to at least partially overcome the abovementioned disadvantage.

The technology herein provides a device for operating at least one door of an aircraft which comprises a fuselage with an exterior surface. The operating device comprises a chassis that is fixed and secured to the fuselage of the aircraft, a control handle that is rotationally movable with respect to the chassis, and a mechanism for converting a rotational movement of the control handle into an opening movement of the door.

This operating device is characterized in that:
  the control handle is translationally movable in an "out" direction with respect to the chassis between an "in" position, in which the control handle does not project with respect to the exterior surface of the fuselage, and an "out" position, in which the control handle projects with respect to the exterior surface of the fuselage,
  the control handle comprises a cylindrical body with an axis and a head connected to one end of the body, and the chassis comprises a guide for guiding the body of the control handle in the "out" direction, and
  the chassis and/or the fuselage comprise an indentation configured to house the head of the control handle in the "in" position, wherein
  the operating device comprises:
  at least one return means configured to push the control handle toward the "out" position,
  an end stop for limiting the movement of the control handle against the action of the singular or plural return means and securing it in the "out" position, and
  a first locking/unlocking mechanism configured to keep the control handle in the "in" position in a first state.

The advantages of the example operating device of the present invention are at least as follows:
  It's purely mechanical design makes it simpler to install.
  The translational movement of the control handle allows it to be in both an "in" position, which limits the effect it has on the drag of the aircraft, and an "out" position, which makes it accessible from outside the fuselage.

In an example embodiment, the first locking/unlocking mechanism comprises:
  a latch supported by the head of the control handle, and
  a catch secured to the chassis,
  the latch and the catch being configured to engage with each other when the first locking/unlocking mechanism is in the first state.

The head of the control handle comprises:
  a fixed part connected rigidly to the body of the control handle and which extends perpendicular to the axis of the body,
  a mobile part connected to the body by an articulation, the mobile part being configured to be in a folded-down position folded down against the fixed part and a deployed position in which the control handler has a T shape.

In an example embodiment, the operating device comprises a second locking/unlocking mechanism configured to lock the mobile part of the head of the control handle in the folded-down position or in the deployed position in a first state, and to release the mobile part in a second state.

The second locking/unlocking mechanism comprises a latch supported by the mobile part of the head of the control handle and two catches which are supported by the fixed part of the head of the control handle, the latch and the catches being configured so that the latch engages with a first catch when the mobile part is in the folded-down position and the latch engages with a second catch when the mobile part is in the deployed position.

In an example embodiment, the latch is movable between a first position and a second position which respectively correspond to the first state and the second state of the second locking/unlocking mechanism, the latch comprising a first hook configured to engage with the catch secured to the chassis when the latch is in the first position, and a second hook configured to engage with one of the catches supported by the fixed part of the head of the control handle when the latch is in the first position, the control handle comprising a return means configured to push the latch into the first position.

In an example embodiment, the operating device comprises a third locking/unlocking mechanism configured to lock rotation of the control handle in a first state and to allow the control handle to rotate in a second state.

The third locking/unlocking mechanism comprises a ball-lock pin inserted into the control handle, the ball-lock pin comprising at least one control and balls that are radially movable between an "out" position and a retracted position respectively corresponding to the first state and the second state of the third locking/unlocking mechanism, the control allowing control over the position of the balls.

The chassis comprises, for each ball, a housing positioned in such a way as to house a ball when the control handle is in the "out" position and the balls are in the "out" position.

DESCRIPTION OF THE DRAWINGS

These and further aspects of the exemplary implementations will become apparent from the following description of example embodiments, the description being given solely by way of example with reference to the attached drawings in which.

DETAILED DESCRIPTION

Figure 1:
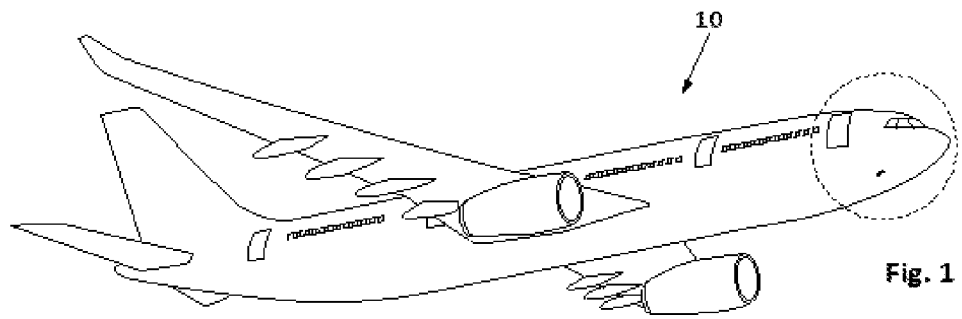
FIG. 1 is a perspective view of an aircraft, according to an example embodiment of the present invention.
Figure 2:
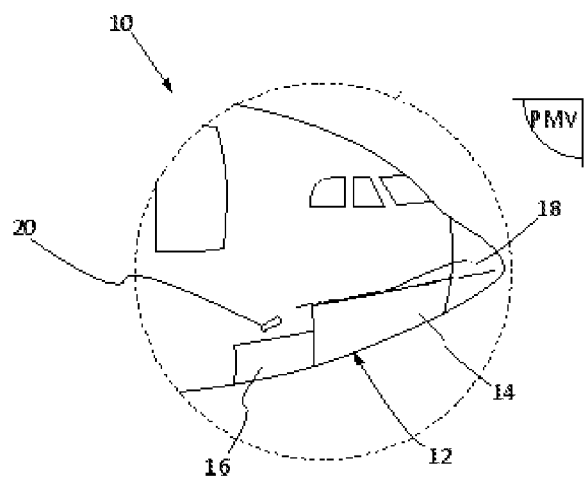
FIG. 2 is a side view of the portion of the front of the aircraft shown in the dotted circle of FIG. 1.

FIGS. 1 and 2 depict an example aircraft 10 which comprises, in the region of its nose, a landing gear bay 12 closed by doors, a pair of front doors 14 and a pair of rear doors 16 positioned symmetrically with respect to a vertical mid-plane PMV of the aircraft 10.

The doors 14 join at the vertical mid-plane PMV. Each front door 14 comprises an articulation for connecting it to the remainder of the fuselage of the aircraft, the articulation being configured to allow the door to pivot about an axis of rotation 18 distant from the vertical mid-plane PMV.

The pivoting movement of each front door is controlled via an actuator of hydraulic type (not visible) and by an operating device 20 (as illustrated in FIGS. 2 to 7), which can be actuated from the ground, and the actuation of which causes at least one of the front doors 14 to open.

The operating device 20 comprises a mobile control handle 22 and a chassis 24 that is fixed and secured to the fuselage 26 of the aircraft.

Figure 4:
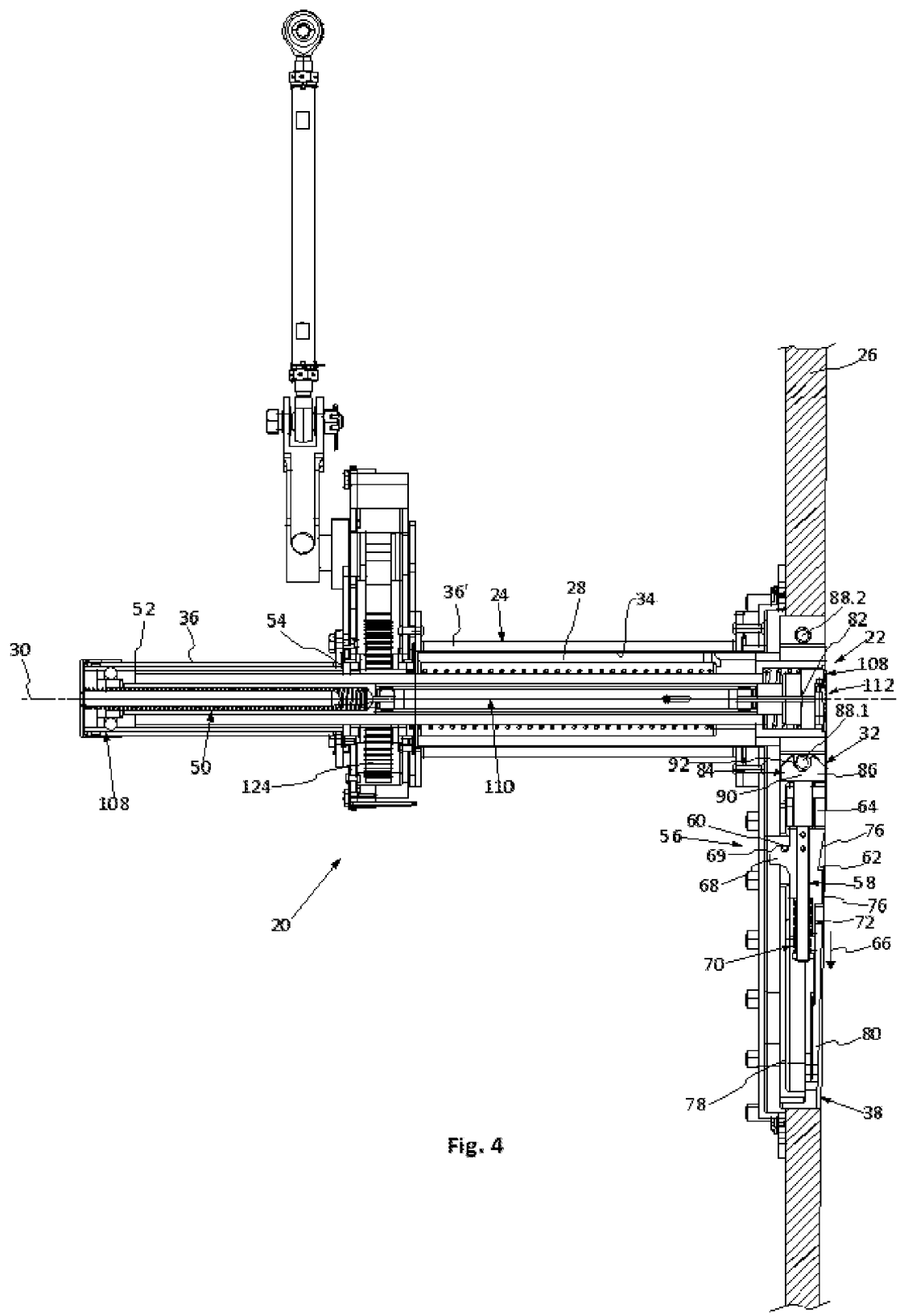
FIG. 4 is a cross section of the control handle of FIG. 3, in an "in" position.
Figure 5:
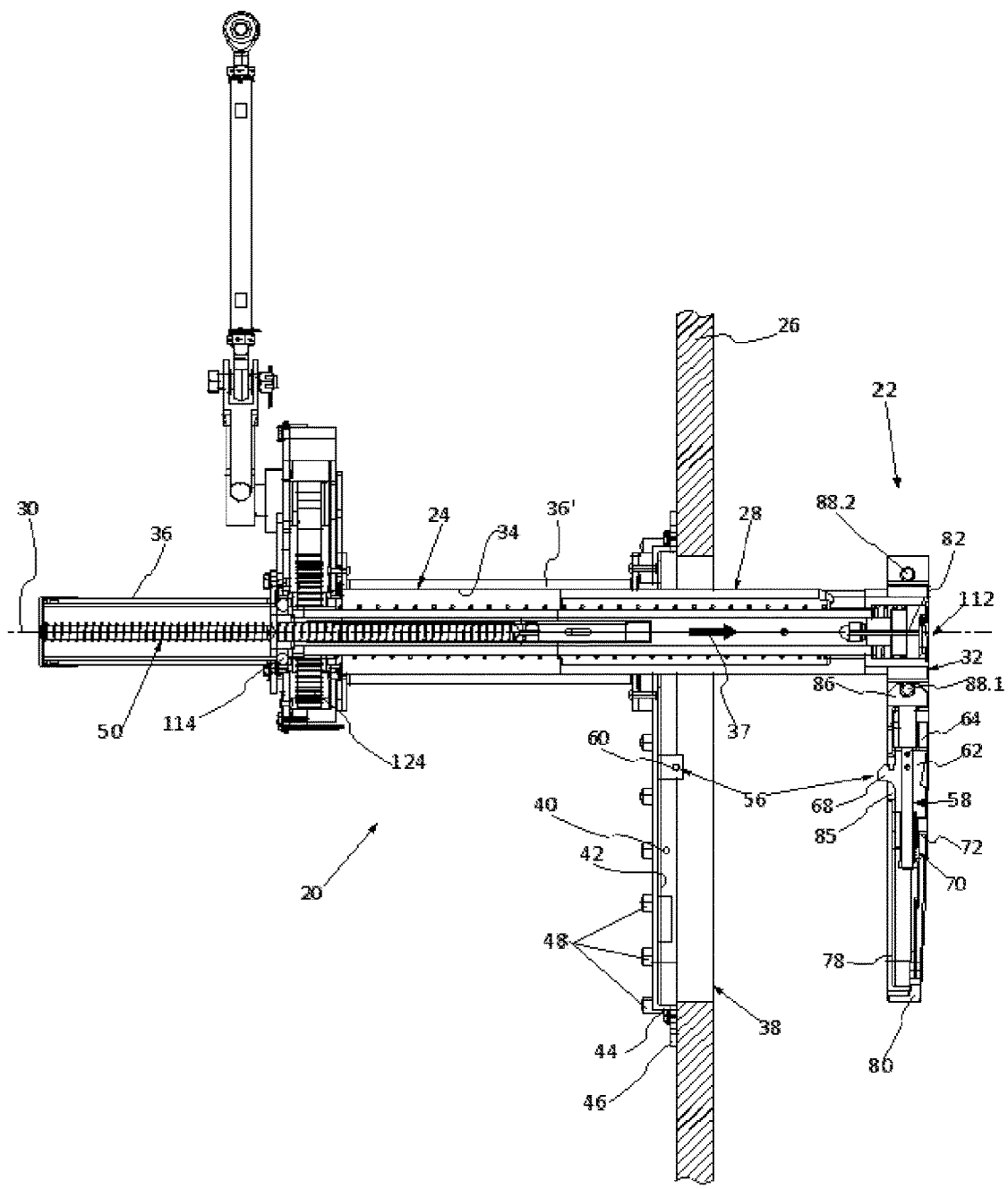
FIG. 5 is a cross section of the control handle of FIG. 3 in an "out" position, configured as an L.

As illustrated in FIG. 4, the control handle 22 comprises a cylindrical body 28 with an axis 30 and a head 32 connected to one end of the body 28 which extends in a plane perpendicular to the axis 30.

Figure 3:
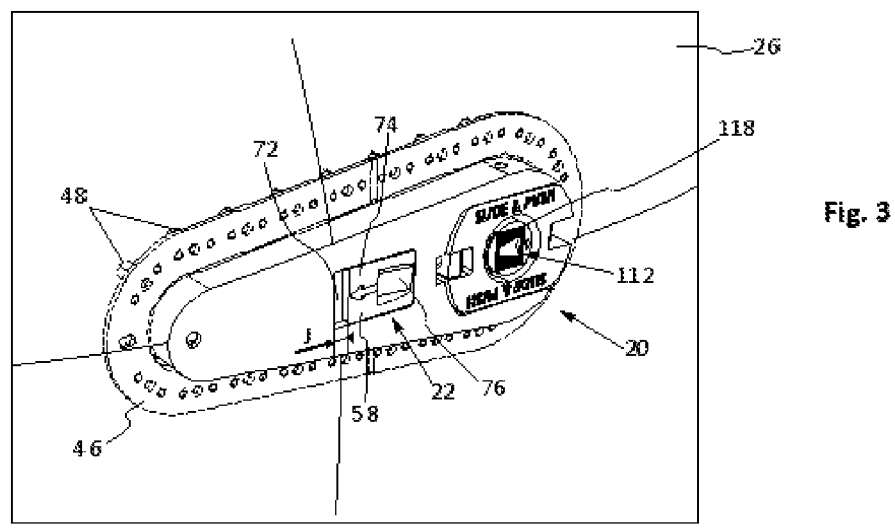
FIG. 3 is a front view of a control handle installed on the exterior surface of the fuselage of the aircraft of FIG. 1, near to a landing gear bay as illustrated in FIG. 2.
Figures 7A, 7B:
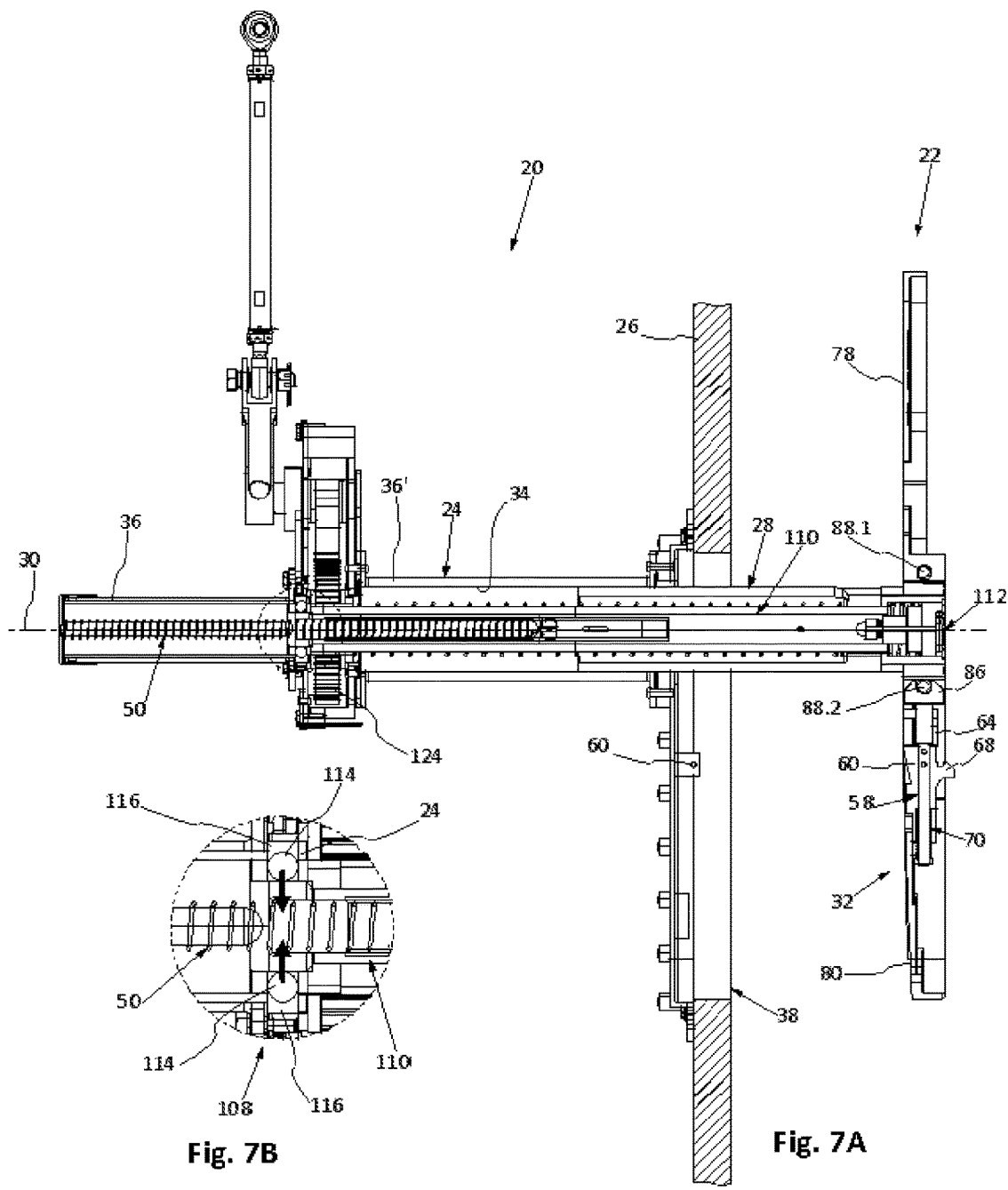
FIG. 7A is a cross section of the control handle of FIG. 3 in an "out" position, configured as a T and in a rotationally unlocked state.
FIG. 7B is an enlarged view of the dotted circle region of FIG. 7A, and FIGS. 8A to 8D are perspective views illustrating how the control handle of FIG. 3 works respectively: 1) in an "in" position, 2) in a L-configured "out" position, 3) in a T-configured "out" position, in a rotationally locked state, and 4) in a T-configured "out" position, in a rotationally unlocked state.
Figure 8A:
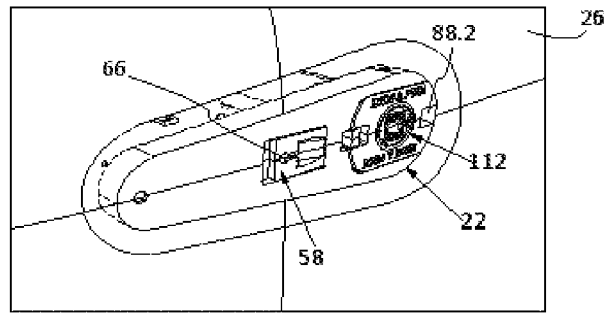

The control handle 22 is translationally movable with respect to the chassis 24 between an "in" position, as illustrated in FIGS. 3, 4 and 8A, in which the control handle 22 is aligned with the exterior surface of the fuselage 26 of the aircraft, and an "out" position, as illustrated in FIGS. 5 to 7 and 8B to 8D, in which the control handle 22 projects with respect to the exterior surface of the fuselage 26 so as to allow an operator to grasp the head 32 of the control handle 22.

Thus, in the "in" position, the control handle 22 has a very small effect on the drag of the aircraft. In the "out" position, the control handle is accessible from the outside of the fuselage and can easily be actuated by an operator.

The chassis 24 comprises a guide 34 on the inside of the fuselage and configured to guide the body 28 of the control handle during movements from the "in" position to the "out" position or vice versa.

In a preferred embodiment, the chassis 24 comprises a first housing to house the body 28 of the control handle 22. According to one example embodiment, the first housing comprises at least one hollow tube 36 inside the fuselage, with an axis approximately perpendicular to the fuselage 26. In general, the first housing comprises several hollow tubes 36, 36' with coinciding axes, arranged one after the other.

At least a portion of at least one hollow tube performs the function of guiding the body 28 of the control handle 22. According to one example embodiment, the hollow tube 36' has an inside diameter substantially equal (taking account of the clearance needed for sliding) to that of the body 28 of the control handle 22 and performs the guiding function.

In operation, when the body 28 is inserted into the hollow tube 36', the body 28 can effect a translational movement in an "out" direction 37 parallel to the axis 30.

The chassis 24 and/or the fuselage 26 comprise an indentation 38 to house the head 32 of the control handle 22 so that the head 32 is aligned with the exterior surface of the fuselage 26 when the control handle 22 is in the "in" position.

In a preferred example embodiment, the chassis 24 comprises a second housing 40 (referenced in FIG. 5) with an end wall 42 and at least one lateral wall 44 perpendicular to the end wall 42, the second housing 40 being configured to at least partially house the head 32 of the control handle 22.

According to one example embodiment, the hollow tube 36' is secured to the second housing 40 and opens onto the end wall 42. The lateral wall 44 has a perimeter identical to that of the head 32 of the control handle, and a small clearance separates the head 32 of the control handle from the lateral wall 44.

The lateral wall 44 comprises a rim 46 parallel to the end wall 42 and configured to be pressed firmly against the interior surface of the fuselage 26.

To fix the chassis 24 to the fuselage 26, a plurality of fixings 48, such as rivets for example, are provided at the periphery of the second housing 40 in the region of the rim 46.

The operating device comprises at least one return means 50, such as a spring for example, which is configured to push the control handle 22 into the "out" position and an end stop to limit the movement of the control handle against the action of the single or plural return means 50 and securing it in the "out" position.

According to one example embodiment illustrated in FIG. 4, the end stop means is made up of a shoulder 52 borne by the body 28 of the control handle 22 and configured to come into contact with a shoulder 54 provided on the chassis 24, more specifically on the hollow tube 36, and thus to limit the translational movement of the control handle 22 in the "out" direction 37 because of the action of the singular or plural return means. Thus, when the shoulder 52 of the body 28 comes into contact with the shoulder 54 of the chassis 24, the control handle 22 is in the "out" position.

The operating device comprises a first locking/unlocking mechanism 56 able to be in a locked first state and an unlocked second state, the first locking/unlocking mechanism 56 being configured to keep the control handle 22 in the "in" position in a locked state.

In an example embodiment, the locking/unlocking mechanism 56 comprises a latch 58 supported by the head 32 of the control handle 22 which engages with a catch 60 secured to the chassis 24.

The latch 58 is mounted with the ability to slide with respect to the head 32. According to one example embodiment, the latch 58 comprises an approximately parallelepipedal body 62 which slides in a guideway 64 made in the head 32 between a first position that corresponds to the locked state and a second position that corresponds to the unlocked state. This guideway 64 is oriented in a direction of unlocking 66 perpendicular to the axis 30 of the control handle 22.

According to one example embodiment, the latch 58 comprises a first hook 68 secured to the body 62, in the shape of a C open toward the catch 60.

In an example embodiment, the first hook 68 comprises an inclined surface 69 that encourages the catch 60 to enter the hook 68 without a need for the latch 58 to effect a translational movement in the unlocked state.

According to one example embodiment, the catch 60 is a cylindrical rod which is dimensioned to enter the first hook 68 and which is positioned perpendicular to the direction of unlocking 66, in a plane perpendicular to the "out" direction 37. The catch 60 is fixed to the end wall 42 of the housing 40 of the chassis 24.

The locking/unlocking mechanism 56 comprises a return means 70 for keeping it in the locked state. According to one example embodiment, the return means 70 is a compression spring interposed between an end stop secured to the head 32 and the body 62 of the latch and which is configured to push the latch 58 so that the first hook 68 is in contact with the catch 60.

In an example embodiment, the head 32 of the control handle 22 comprises an opening 72 through which the latch 58 can be accessed from outside the head 32 of the handle. According to one example embodiment, the opening 72 is provided at one of the faces of the head 32 of the control handle 22 lying in the continuity of the exterior surface of the fuselage 26 when the control handle 22 is in the "in" position. The body 62 of the latch 58 comprises a projecting part that enters the opening 72, with a visible surface 74 positioned in the continuity of the face of the head 32 of the control handle 22, and the face of the head 32 is itself in the continuity of the exterior surface of the fuselage 26. This configuration makes it possible to limit the effect that the operating device has on the drag of the aircraft.

With this configuration, there is a clearance J (as illustrated in FIG. 3) between the projecting part of the latch and the opening 72 so as to allow the latch 58 to move between the first position that corresponds to the locked state and the second position that corresponds to the unlocked state.

According to one example embodiment, the visible surface 74 of the latch comprises a form in relief, for example, a notch 76, so as to make the latch 58 easier for an operator to operate.

In another example embodiment, the head 32 of the control handle comprises a fixed part 78 connected rigidly to the body 28 of the control handle 22 and a mobile part 80 connected to the body 28 by an articulation. The mobile part 80 is configured to be in a folded-down position folded down against the fixed part 78, which corresponds to an L-configuration of the control handle 22, and a deployed position which corresponds to a T-configuration of the control handle 22.

Figure 8B:
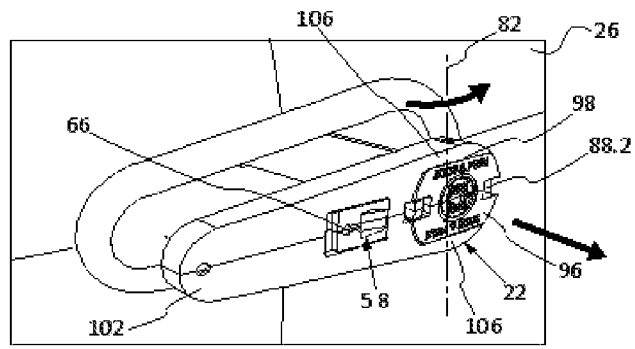
Figure 8C:
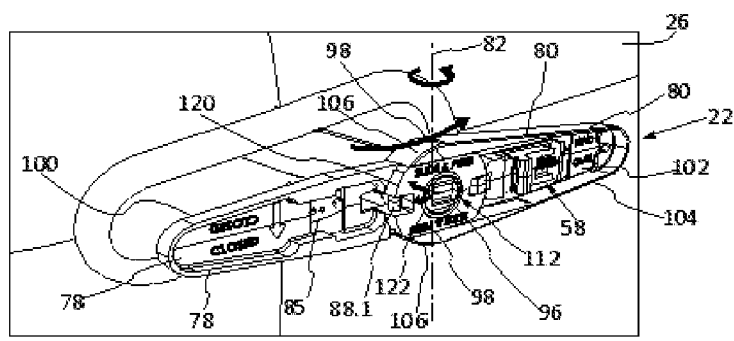
Figure 8D:
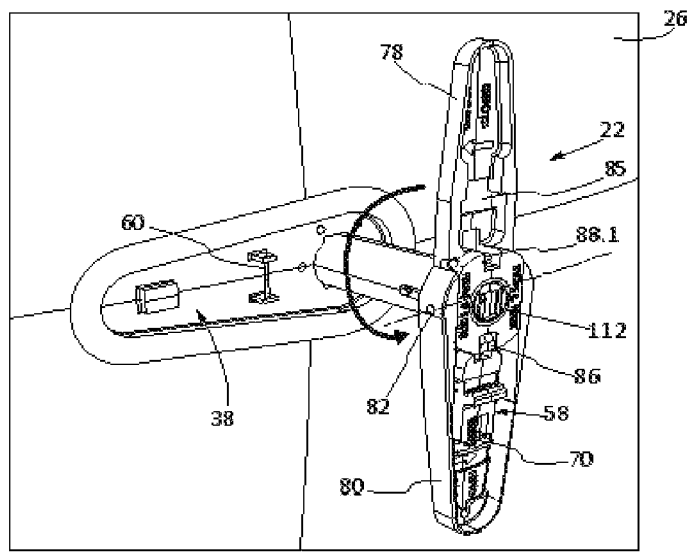

According to one example embodiment, the articulation comprises a pivot axis 82 (as illustrated in FIG. 8D) secant and perpendicular to the axis 30 of the body 28 of the control handle 22.

In an example embodiment, the control handle 22 comprises a second locking/unlocking mechanism 84 able to be in a locked first state and an unlocked second state, the second locking/unlocking mechanism 84 being configured to lock the mobile part 80 of the head 32 of the control handle 22 either in the folded-down position or in the deployed position in the locked state and to release the mobile part 80 in the unlocked state.

The latch 58 is common to the first and second locking/unlocking mechanisms 56 and 84. This configuration makes it possible to reduce the number of parts.

With this configuration, the latch 58 is supported by the mobile part 80 and the fixed part 78 comprising an opening 85, through which the first hook 68 and/or the catch 60 extends or extend.

According to one example embodiment, the latch 58 comprises a second hook 86, and the head 32 of the control handle comprises two catches 88.1 and 88.2. Thus, as illustrated in FIG. 4, the latch 58 comprises, in the continuation of the body 62, a C-shaped head 90 which performs the function of the second hook 86 and which comprises a notch 92 with a U-shaped section open toward the body 28. In an example embodiment, the second hook 86 comprises two inclined surfaces 94 positioned one on each side of the notch 92 to encourage the catches 88.1 and 88.2 to enter the notch 92 without the need for the latch 58 to effect a translational movement in the unlocked state.

In parallel, each catch 88.1, 88.2 is a rod secured to the fixed part 78 of the head 32 of the control handle, and each catch is dimensioned to enter the second hook 86 and is positioned perpendicular to the direction of unlocking 66 in a plane perpendicular to the "out" direction 37. The catches 88.1 and 88.2 are positioned symmetrically with respect to the pivot axis 82, a first catch 88.1 with which the second hook 86 engages in the folded-down position being positioned with respect to the pivot axis 82 on the same side as the fixed part 78, a second catch 88.2 with which the second hook 86 engages in the deployed position being arranged opposite.

In an example embodiment, when the latch 58 is used as first and second locking/unlocking mechanisms 56 and 84, the return means 70 is positioned in such a way as to push the latch 58 toward the body 28 of the control handle 22 and the hooks 68 and 86 are open toward the body 28 of the control handle 22. The catches 60, 88.1 and 88.2 are positioned in such a way that the first hook 68 engages with the catch 60 in the locked state when the control handle 22 is in the "in" position, the second hook 86 engages with the catch 88.1 in the locked state when the control handle 22 is configured as an L, the second hook 86 engages with the catch 88.2 in the locked state when the control handle is configured as a T, and the hooks 68 and 86 being spaced away from the catches 60, 88.1 and 88.2 in the unlocked state.

According to an example embodiment, as illustrated in FIGS. 8B and 8C, the head 32 of the control handle comprises:

a cylindrical central part 96 with an axis in the continuation of the axis 30 of the body 28 and which comprises two diametrically opposed flats 98, pivot axes 82 extending on each side of the central part 96 perpendicular to the flats 98, a first flange 100 extending in a plane perpendicular to the axis 30 and with the central part 96 forming the fixed part 78 of the head 32, and a second flange 102 comprising a rim 104 at the periphery and two branches 106 mounted to pivot on the pivot axes 82 and forming the mobile part 80.

The flanges 100 and 102 are dimensioned so that the second flange 102 fits over the first flange 100 in the folded-down position, the rim 104 being positioned around the first flange 100. In the folded-down position, the latch 58 is positioned between the two flanges 100 and 102.

Figures 6A, 6B:
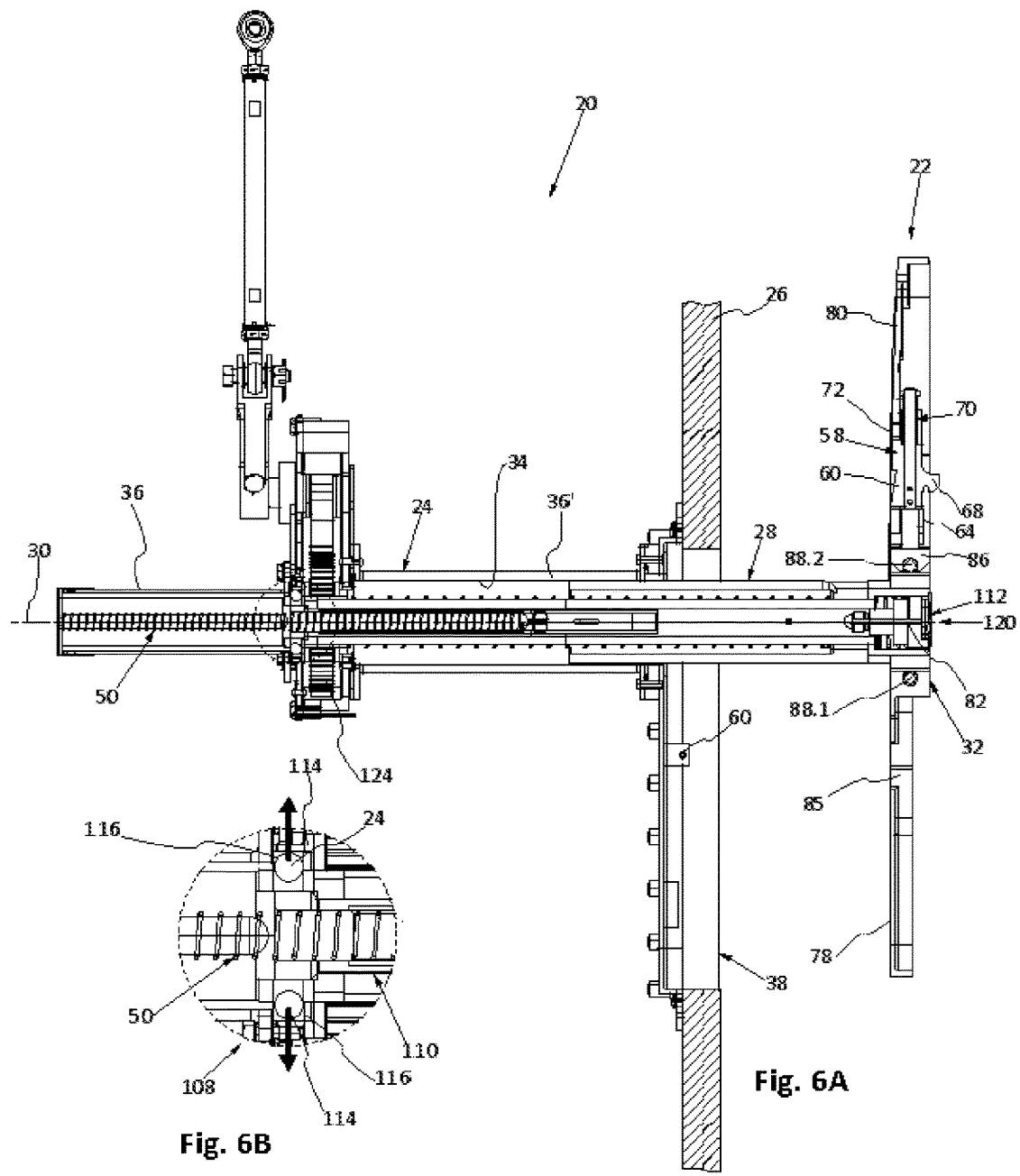
FIG. 6A is a cross section of the control handle of FIG. 3 in an "out" position, configured as a T and in a rotationally locked state.
FIG. 6B is an enlarged view of the dotted circle region of FIG. 6A.

According to another aspect of the invention, as shown in FIGS. 6-7, the operating device comprises a third locking/unlocking mechanism 108 able to be in a locked first state and an unlocked second state, the third locking/unlocking mechanism 108 being configured to rotationally lock the control handle 22 in the locked state and to allow the control handle 22 to rotate in the unlocked state.

In one example embodiment, as shown in FIGS. 7A-7B, the third locking/unlocking mechanism 108 is a ball-lock pin 110 which is inserted into the body 28 of the control handle, coaxial with the axis 30. This ball-lock pin 110 is of approximately cylindrical shape and at a first end comprises at least one control 112 and near the second end comprises balls 114 that are movable radially (perpendicular to the axis 30).

The balls 114 are movable between a retracted position, as illustrated in FIGS. 7A-7B, which corresponds to the unlocked state, and an "out" position as illustrated in FIG. 6, which corresponds to the locked state. The control 112 allows control over the position of the balls and thus over the locked or unlocked state of the third locking/unlocking mechanism 108.

The chassis 24 comprises housings 116, one for each ball 114, which are positioned in such a way that the balls 114 become lodged in their housings when the control handle 22 is in the "out" position and the balls 114 are in the "out" position.

As illustrated in FIG. 3, the ball-lock pin 110 is positioned in the body 28 of the control handle in such a way that the visible surface 118 of the control 112 lies in the continuity of the face of the head 32 of the control handle, and the face of the head 32 is itself in the continuity of the exterior surface of the fuselage 26 when the control handle is in the "in" position.

The visible surface 118 of the control 112 comprises a form in relief to make it easier to actuate.

The control 112 is movable in two directions, a first direction 120 parallel to the axis 30 of the body 28 of the control handle 22, and a second direction 122 perpendicular to the axis 30 of the body 28, as illustrated in FIG. 8C.

Thus, to switch the ball-lock pin into the unlocked state and thus allow the control handle 22 to be rotated, it is necessary to move the control 112 in the second direction 122 and then to push it in, in the first direction 120. Through the combination of these two movements, the balls 114 are able to effect a translational movement from the "out" position to the retracted position. It is therefore possible to rotate the control handle 22.

This dual action required for unlocking makes the device safer to operate.

The operating device comprises a mechanism for converting a rotational movement of the control handle 22 into an opening movement of at least one front door 14. According to one example embodiment, the operating device comprises a pinion 124 with an axis of rotation that coincides with the axis 30 of the body 28 of the control handle, mounted with the ability to pivot with respect to the chassis 24. This pinion 124 is positioned between the two hollow tubes 36 and 36', has the body 28 passing through it, and is rotationally coupled to the latter by keying. In a preferred example embodiment, the operating device comprises a gearbox to step down the forces.

The purely mechanical design of the operating device makes it easier to install.

The principle of operation of the operating device is described with reference to FIGS. 8A to 8D. In FIG. 8A, the control handle 22 is in the "in" position and does not project with respect to the exterior surface of the fuselage 26.

In order to make the control handle 22 pop out, it is necessary to slide the latch 58 in the direction of unlocking 66 as illustrated in FIG. 8A. This movement of the latch 58 causes the first locking/unlocking mechanism 56 to unlock. Because of the action of the return means 50, the control handle 22 effects a translational movement into the "out" position and begins to project with respect to the exterior surface of the fuselage 26, as illustrated in FIG. 8B.

As soon as the control handle 22 reaches the "out" position, rotation of it is locked by the third locking/unlocking mechanism 108.

In order to deploy the head 32 of the control handle, the latch 58 needs to be slid again in the unlocking direction 66 as illustrated in FIG. 8B. This movement of the latch 58 causes the second locking/unlocking mechanism 84 to unlock. It then becomes possible to pivot the mobile part 80 of the head 32 of the control handle about the pivot axis 82 as far as the deployed position as illustrated in FIG. 8C. When the mobile part 80 reaches the deployed position, rotation of the mobile part 80 is automatically locked by the second locking/unlocking mechanism 84.

In order to be able to pivot the control handle 22, it is necessary to manipulate the control 112 by moving it in the second direction 122 then by pushing it in, in the first direction 120 as illustrated in FIG. 8C in order to unlock the third locking/unlocking mechanism 108. It then becomes possible to pivot the control handle 22 as illustrated in FIG. 8D, so as to cause the front doors 14 to open.

As an alternative, it is possible to use the control handle 22 in an L configuration. In such a case, having popped the head out, it is possible to unlock the third locking/unlocking mechanism 108 and then to pivot the control handle 22 without having pivoted the mobile part 80 beforehand.

Although described in an application to the opening of a landing gear door, the operating device is not in any way restricted to this application and could be used for opening other doors of an aircraft from outside the fuselage.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, the terms "a" or "one" do not exclude a plural number and the term "or" means either or both. Furthermore, characteristics or steps which have been described with reference to one of the above exemplary embodiments may also be used in combination with other characteristics or steps of other exemplary embodiments described above.

The invention is:

1. A device for operating at least one door of an aircraft which comprises a fuselage with an exterior surface, the device comprising a chassis that is fixed and secured to the fuselage of the aircraft, a control handle that is rotationally movable with respect to the chassis, and a mechanism for converting a rotational movement of the control handle into an opening movement of the door, wherein the control handle is translationally movable with respect to the chassis between an in position in which the control handle is aligned with the exterior surface of the fuselage and an out position in which the control handle projects beyond the exterior surface of the fuselage, the control handle comprises a cylindrical body with an axis and a head connected to one end of the cylindrical body,
the chassis comprises a guide for guiding the body of the control handle in an out direction,
the chassis and/or the fuselage comprise an indentation configured to house the head of the control handle in the in position,
at least one first return mechanism configured to push the control handle toward the out position, an end stop for limiting the movement of the control handle against the at least one first return mechanism and securing the control handle in the out position, and a first locking/unlocking mechanism configured to lock the control handle in the in position, and
the head of the control handle comprises:
a fixed part rigidly connected to the cylindrical body of the control handle and which extends perpendicular to the axis of the cylindrical body, and
a mobile part connected to the cylindrical body by an articulation, the mobile part being configured to be in a folded-down position folded down against the fixed part of the handle and be in a deployed position in which the control handle forms a T shape, wherein the T shape is formed by the cylindrical body, the fixed part extending longitudinally in a first direction which is perpendicular to the cylindrical body and the mobile part extending laterally in a second direction that is perpendicular to the cylindrical body and opposite to the first direction.

2. The device according to claim 1, wherein the first locking/unlocking mechanism comprises a latch supported by the head of the control handle and a catch secured to the chassis, the latch and the catch being configured to engage with each other when the first locking/unlocking mechanism is in the first state.

3. The device according to claim 1, further comprising a second locking/unlocking mechanism configured to lock the mobile part of the head of the control handle in the folded-down position or in the deployed position in a first state and to release the mobile part in a second state.

4. The device according to claim 3, wherein the second locking/unlocking mechanism comprises a latch supported by the mobile part of the head of the control handle and two catches which are supported by the fixed part of the head of the control handle, the latch and the two catches being configured so that the latch engages with a first catch of the two catches when the mobile part is in the folded-down position and engages with a second catch of the two catches when the mobile part is in the deployed position.

5. The device according to claim 4, wherein the latch is movable between a first position and a second position which respectively correspond to the first state and the second state of the second locking/unlocking mechanism, the latch comprising a first hook configured to engage with the first catch secured to the chassis when the latch is in the first position, and a second hook configured to engage with second catch supported by the fixed part of the head of the control handle when the latch is in the first position, the control handle comprising a second return mechanism configured to push the latch into the first position.

6. The device according to claim 1, further comprises a third locking/unlocking mechanism configured to lock rotation of the control handle in a first state and to allow the control handle to rotate in a second state.

7. The device according to claim 6, wherein the third locking/unlocking mechanism comprises a ball-lock pin inserted into the control handle, the ball-lock pin comprising at least one control and balls, the balls being radially movable between an out position and a retracted position corresponding to the first state and the second state of the third locking/unlocking mechanism respectively, the control allowing control over the position of the balls.

8. The device according to claim 7, wherein the chassis comprises, for each ball, a housing configured to house a ball when the control handle is in the out position and the balls are in the out position.

9. The device according to claim 1, wherein the end stop includes a first shoulder carried by the body of the control handle and configured to contact with a second shoulder on the chassis.

10. An operating device for operating a door of an aircraft, comprising:
a chassis connected to a fuselage of the aircraft and having a first housing substantially perpendicular to the fuselage and a guide inside of the fuselage,
a rotatable control handle having a cylindrical body and a head connected to one end of the body, the body being housed within the first housing of the chassis, and
a conversion mechanism for opening the door in response to rotations of the control handle, wherein
the body of the control handle is guided by the guide of the chassis to move between an in position in which the control handle is aligned with an exterior surface of the fuselage and an out position in which the control handle projects beyond the exterior surface of the fuselage,
the operating device includes a first spring configured to push the control handle toward the out position, a stop for limiting the movement of the control handle against the first spring and securing the control handle in the out position, and a first locking mechanism configured to lock the control handle in the in position in a locked state,
the head of the control handle includes:
a fixed part rigidly connected to the body of the control handle and extending perpendicular thereto, and
a movable part rotatably connected to the body, having a folded-down position against the fixed part of the handle and a deployed position in which the control handle forms a T shape, wherein the T shape results from the fixed part and mobile part both extending longitudinally in a first direction which is perpendicular to the body of the control handle, and the mobile part extending laterally in second direction which perpendicular to the body of the control handle and opposite to the first direction.

11. The operating device according to claim 10, wherein the chassis or the fuselage include an indentation configured to house the head of the control handle in the in position.

12. The operating device according to claim 10, wherein the stop includes a first shoulder carried by the body of the control handle and configured to contact with a second shoulder on the first housing of the chassis.

13. The operating device according to claim 10, wherein the first lock mechanism includes a latch supported by the head of the control handle and a catch secured to the chassis, the latch and the catch engaging with each other when the first locking mechanism is in the locked state.

14. The operating device according to claim 10, further comprising a second locking mechanism configured to lock the movable part in a locked state and to release the movable part in a unlocked state.

15. The operating device according to claim 14, wherein the second locking mechanism comprises a latch supported by the movable part and two catches which are supported by the fixed part, the latch being configured to engage with a first catch of the two catches when the movable part is in the folded-down position and engage with a second catch of the two catches when the movable part is in the deployed position.

16. The operating device according to claim 15, wherein the latch is movable between a first position and a second position corresponding to the locked state and unlocked state of the second locking mechanism respectively, the latch including a first hook configured to engage with the first catch secured to the chassis when the latch is in the first position, and a second hook configured to engage with second catch supported by the fixed part when the latch is in the first position, the control handle including a second spring configured to push the latch into the first position.

17. The operating device according to claim 10, further comprising a third locking mechanism configured to lock rotation of the control handle in a locked state and allow the control handle to rotate in a unlocked state.

18. The operating device according to claim 17, wherein the third locking mechanism includes a ball-lock pin inserted into the control handle, the ball-lock pin including at least one control and balls, the balls being radially movable between an out position and a retracted position corresponding to the locked state and the unlocked state of the third locking mechanism respectively, the control controlling the positions of the balls.

19. The operating device according to claim 18, wherein the chassis includes, for each ball, a second housing configured to house a ball when the control handle is in the out position and the balls are in the out position.

* * * * *